UNITED STATES PATENT OFFICE.

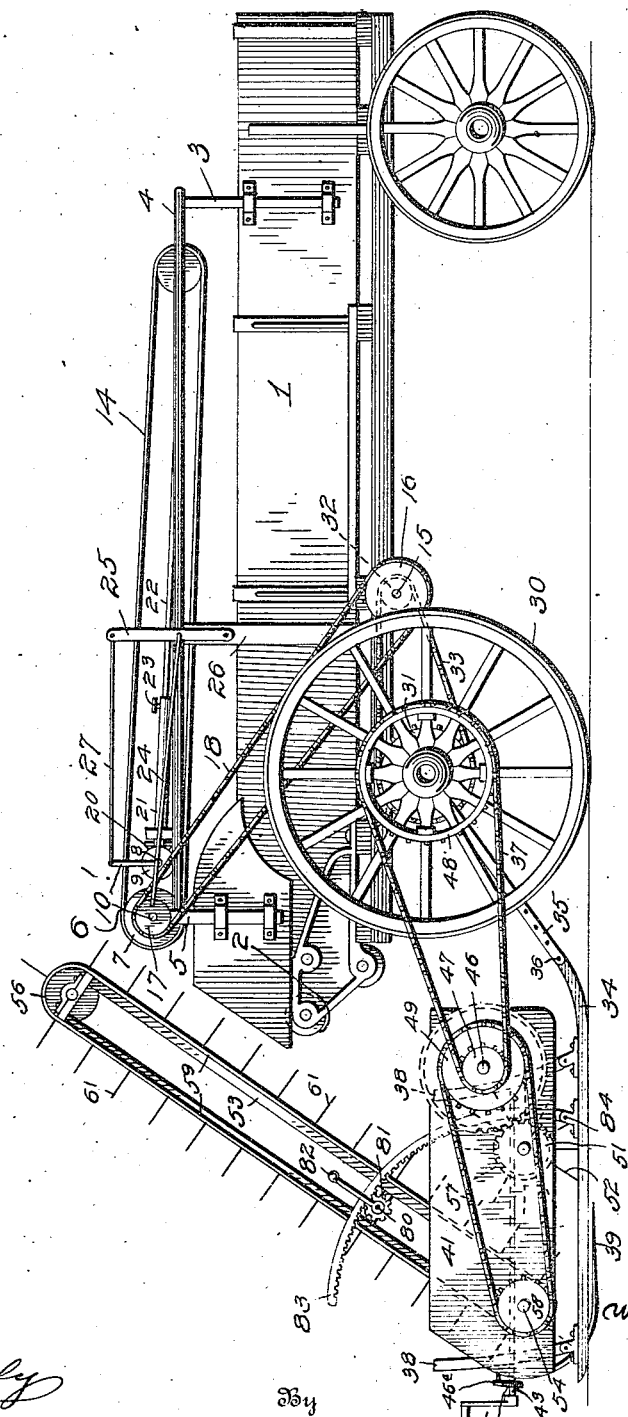

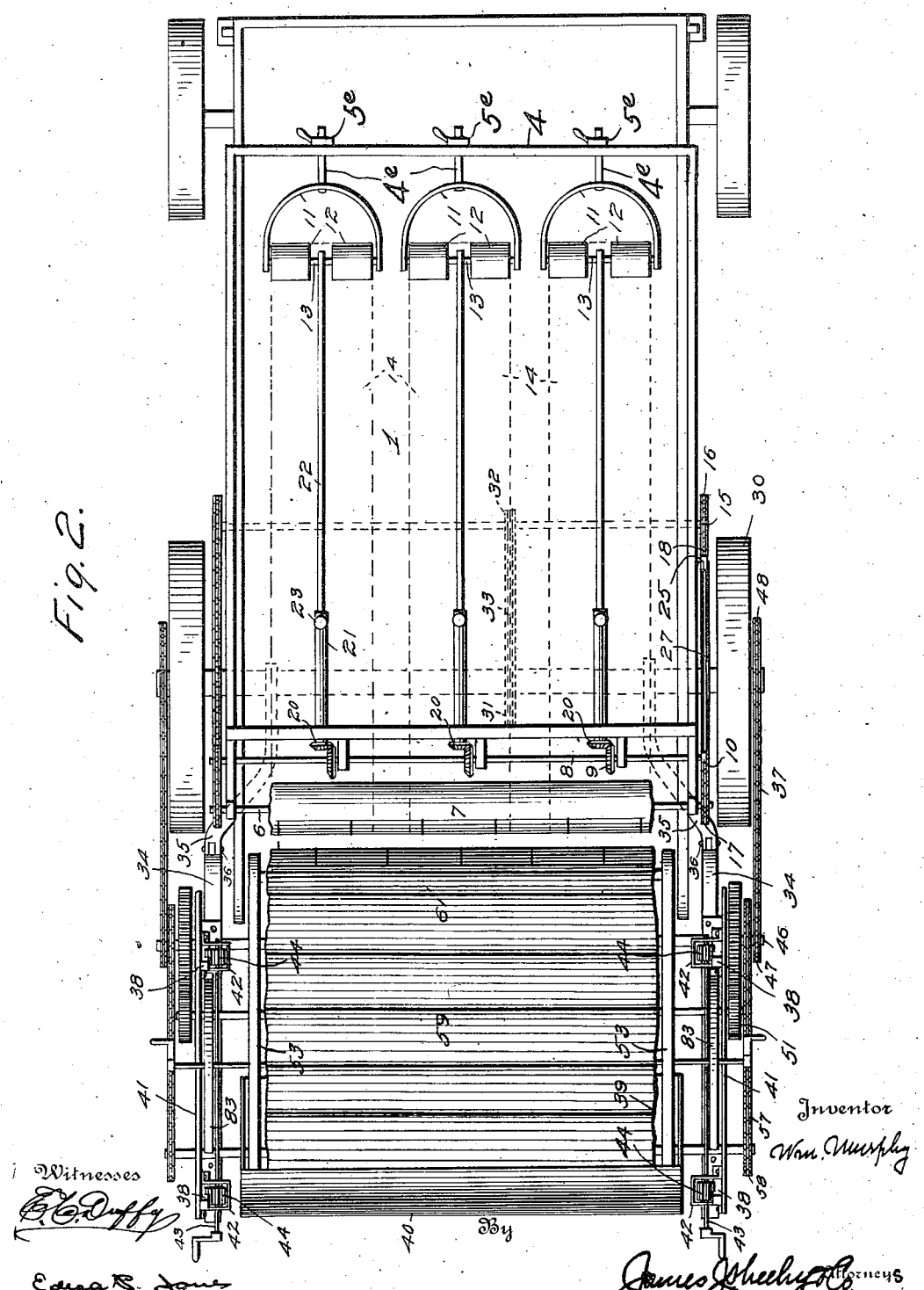

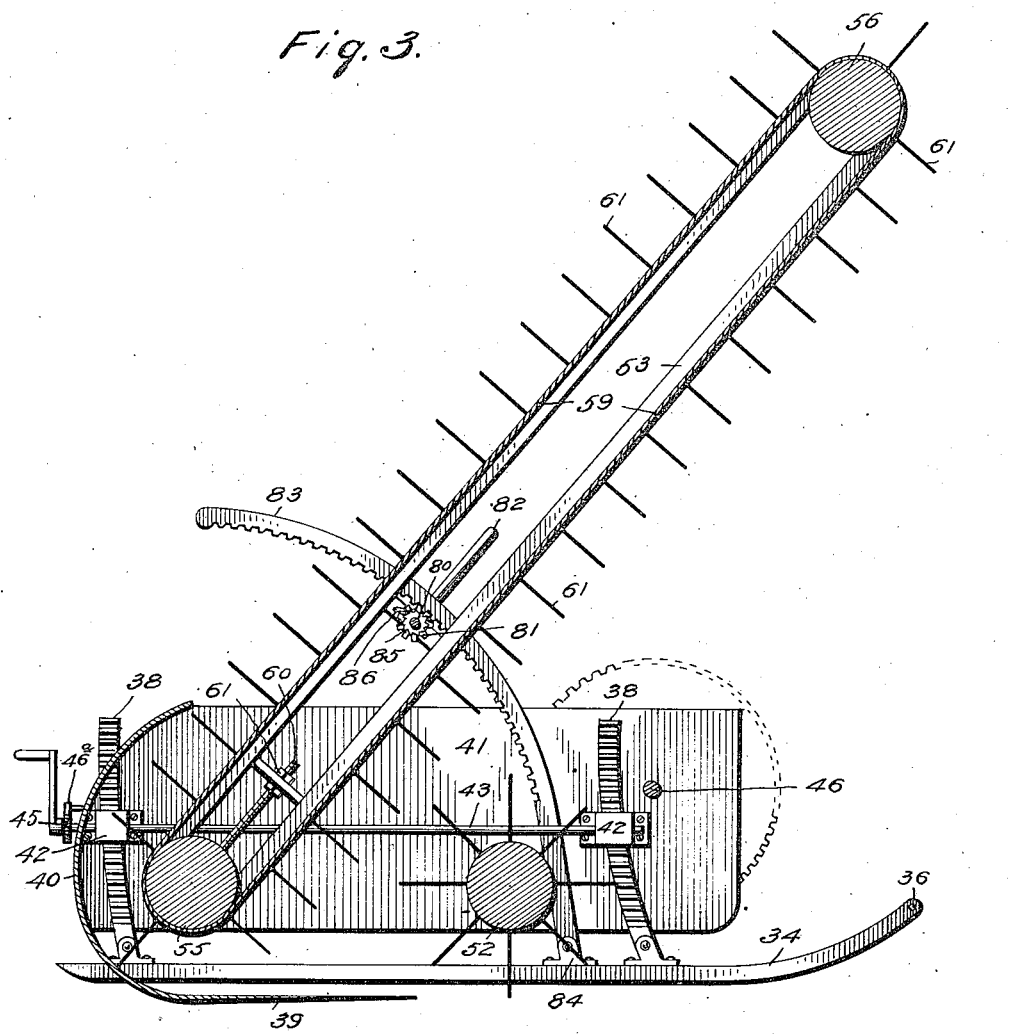

WILLIAM MURPHY, OF EDEN VALLEY, MINNESOTA.

MANURE-LOADING APPARATUS.

1,142,197.

Specification of Letters Patent. Patented June 8, 1915.

Application filed April 13, 1914. Serial No. 831,436.

*To all whom it may concern:*

Be it known, that I, WILLIAM MURPHY, a citizen of Great Britain, residing at Eden Valley, in the county of Meeker and State of Minnesota, have invented new and useful Improvements in Manure-Loading Apparatus, of which the following is a specification.

My present invention pertains to vehicles such as are equipped with loading apparatus.

The general object of the invention is to provide a vehicle having means for taking up manure and delivering the same to the body of the vehicle as the vehicle is drawn or otherwise moved forwardly.

Another object is to provide the loading means on a manure spreader, and to so construct and arrange the said means that it can be readily detached after the spreader is loaded, so as not to interfere with the subsequent spreading of the manure.

Another object is the provision of a loading apparatus embodying means for taking manure from the ground, means for elevating the manure, and means for receiving manure from the elevator and distributing the same evenly in a vehicle body.

Other objects and advantageous features of the invention will be fully understood from the following description and claims when the same are read in connection with the drawings, accompanying and forming part of this specification, in which:

Figure 1 is a side elevation illustrating a manure spreading vehicle equipped with my novel loading apparatus. Fig. 2 is a plan of the same, showing the end portions of the elevator apron and the upper roller broken away. Fig. 3 is an enlarged detail vertical section illustrative of the elements of the apparatus that are carried on the runners.

Similar numerals of reference designate corresponding parts in all of the views of the drawings.

In furtherance of my invention, a manure spreader having a body 1 and the conventional or any other suitable manure spreading means, indicated by 2 in Fig. 1, is provided at 3 on the forward portion of the body 1 with uprights to which is fixedly connected the forward portion of a frame 4. The rear portion of said frame 4 is fixedly connected to uprights 5, carried by the body, as best shown in Fig. 1.

Journaled in the uprights 5 is the shaft 6 of a roller 7, and also journaled in the sides of the frame 4 is a rock-shaft 8, equipped with beveled gears 9 and with an upwardly extending crank arm 10.

Pivotally connected so as to swing transversely on bolts 4ᵉ adjustably connected by nuts 5ᵉ to the forward cross-bar of the frame 4 are bails 11, in each of which is mounted two spaced rollers 12, suitably mounted on a shaft 13.

It will also be seen by comparison of Figs. 1 and 2 that three belts 14, are employed, all of the belts being passed around the roller 7, and each belt being also passed around one pair of rollers 12. The roller 7 is driven from a transverse shaft 15 through the medium of sprocket gears 16, sprocket gears 17 on shaft 6, and belts 18, mounted on and connecting the sprocket gears 16 and 17. It will thus be seen that during the forward progress of the vehicle, the upper stretches of the belt 14 are adapted to receive manure from the elevator, hereinafter specifically described, and convey the manure to a point above the forward portion of the vehicle body 1.

Intermeshed with the beveled gears 9 on the shaft 8, are beveled gears 20 fixed on the rear tubular sections 21 of extensible shafts, each of the said shafts also comprising a section 22, that is connected to one of the shafts 13, and is arranged in a tubular section 21 in such manner as to turn therewith and to be capable of endwise movement relative thereto. The forward section 22 of each shaft is adjustably fixed to its complementary section 21 by a set screw 23. By virtue of this construction, when the shaft 8 is rocked about its axis, the bails 11 will be swung on their centers of movement, and consequently the forward portions of the belts 14 will be canted first to the left and then to the right, this in order to enable the belts to discharge the manure on their upper stretches into the body 1. The rock-shaft 8 is actuated from the sprocket gear 17 through the medium of a rod 24 connected off the center to the gear 17, a lever 25 connected to the forward end of the rod 24 and fulcrumed on an upright 26, and a rod 27 interposed between and connecting the lever 25 and the crank 10.

The shafts for rocking or swinging the bails 11 are made extensible, as described, in order that the said shafts may be adapted for use in connection with belts longer or shorter than the belts illustrated; also, in order that slack of the belts can be taken up.

The shaft 15 which is carried by the running gear of the manure spreader, is driven from one of the rear ground wheels 30 of the spreader, through the medium of a sprocket gear 31 fixed to the wheel 30, a sprocket gear 32 fixed on the shaft 15, and a sprocket belt 33 mounted on the gears 31 and 32.

Arranged to trail on the ground in rear of the manure spreader or vehicle, are spaced runners 34. These runners are connected through the medium of shafts 35, with the rear axle of the vehicle, the shafts 35 being hinged at 36 to the runners, and being provided, when desired, with means whereby they may be increased or diminished in length, this in order that slack of the driving belts 37 may be taken up when occasion demands.

Pivotally connected to and rising from the runners 34 are curvilinear racks 38, and arranged and movable vertically between the runners is a shoe 39, the function of which is to scrape manure from the ground and retain it in position to be engaged by the blades of the elevator. The said shoe 39 is provided with an upwardly extending shield portion 40, and fixed to and extending forwardly from the said shield portion and arranged outside the curvilinear racks 38, are side plates 41. It will be understood in this connection that the shoe 39, the shield 40 and the side plates 41 are fixed with respect to each other so as to be moved as a unit.

Fixed to the side plates 41 and straddling the curvilinear racks 38 are boxes 42, and journaled in said boxes are longitudinal shafts 43, which are provided within the boxes 42, with pinions 44. The said pinions 44 are intermeshed with the racks 38, and consequently it will be seen that when the shafts 43 are turned in one direction, the shoe 39, the shield 40 and the side plates 41 will be raised, while when said shafts 43 are turned in the opposite direction, the shoe, shield and side plates will be lowered. With a view to holding or adjustably fixing the side plates 41 and the parts movable therewith in the positions in which they are placed, each of the shafts 43 is provided with a ratchet disk 45 designed to be engaged by a dog 46ª, supported on the side plates as shown.

Journaled in the forward portions of the side plates 41 is a transverse shaft 46 on which are sprocket gears 47, designed to be connected through the before-mentioned belts 37 with sprocket gears 48, suitably fixed to the rear wheels 30 of the vehicle. Also fixed on the shaft 46 are sprocket gears 49, and spur gears 50. The spur gears 50 are intermeshed with spur gears 51, fixed on the trunnions of a rotary breaker 52 that is arranged between the side plates 41, and is made up of a body and blades suitable to its purpose. The breaker as its name imports, is designed and adapted to loosen or open the manure during the progress of the machine, so as to enable the shoe 39 to scoop up the manure and retain the same in proximity to the lower portion of the elevator. Incidental to the forward movement of the vehicle, the breaker is rotated through the medium of the driving connection described, its trunnions being journaled in the side plates 41.

The frame 53 of the elevator is pivotally connected at 54 to the side plates 41, and at the lower and upper ends of the frame are rollers 55 and 56, the roller 55 being driven from the sprocket gears 49 through the medium of belts 57 which take around the sprocket gears 49, and also around sprocket gears 58 on the trunnions of the roller 55. The trunnions of the roller 55 are arranged in slots in the frame 53 and the side plates 41, so that when occasion demands the roller can be moved relative to the frame 53 and adjustably fixed to take up slack of the endless apron 59 of the elevator; the said movement and adjustable fixture being effected by threaded bolts 60, adjustably secured by nuts 61 to the frame.

On the endless apron 59 are blades 61, designed and adapted to take up manure from the shoe 39 and discharge the same on the upper stretches of the belts 14. At this point I would have it understood that the blades 61 may be of the construction illustrated, or of any other construction, compatible with the purpose of my invention, without involving departure from the scope of the invention as claimed.

Journaled in suitable bearings in the elevator frame 53, is a transverse shaft 80, which is equipped with pinions 81 and a crank 82. The pinions 81 are intermeshed with curvilinear racks 83, which are pivotally connected at 84 to the runners 34, and are arranged above the pinions 81, as shown. By turning the shaft 80 through the medium of the crank 82, the elevator can be swung vertically so as to properly position its upper portion above and in proximity to the rear portions of the aprons 14. It will also be observed that when the shaft 80 is provided with a ratchet disk 85, a dog 86 arranged on the elevator frame 53 and in engagement with said disk 85 will retain the elevator in the inclined position in which it is placed.

By adjusting the shafts 43 to raise or lower the side plates 41, the shoe 39 and the breaker 52, the said shoe and breaker can be nicely regulated to suit the character of the ground to be traversed or the quantity of manure on the ground. It will be noticed in this connection that the pivotal connection of the racks 83 enables the said racks to accommodate themselves to the changing of the center of movement of the elevator frame 53 when the side plates 41 are raised or lowered to the slight extent necessary.

In the practical operation of my invention, it will be observed that when the vehicle equipped as shown in Figs. 1 and 2 is drawn over the ground, the beater will loosen the manure on the ground, and the same will be taken up by the shoe 39. The elevator will take the manure from the said shoe and discharge it on the belts 14, and the said belts 14 will convey the manure forwardly and discharge it laterally into the body 1, and in so doing will distribute the manure evenly on the bottom of the body.

When the body is loaded with manure, the driving belts 31 may be opened, and the shafts 35 may be disconnected from the rear axle of the manure spreader, whereupon the vehicle may be used as a manure spreader *per se*. I would also say in this connection that after a supply of manure in the body 1 has been discharged therefrom, my invention contemplates again connecting the runners 34 with the rear axle of the vehicle, and the replacing of the belts 37 to establish the driving connection between the rear wheels 30 of the vehicle and the shaft 46 of the loader.

I have entered into a detailed description of the construction and relative arrangement of parts embraced in the present and preferred embodiment of my invention, in order to impart a full, clear, and exact understanding of the said embodiment. I do not desire, however, to be understood as confining myself to the said specific construction and relative arrangement of parts, as, in the future practice of the invention, such changes or modifications may be made as fairly fall within the scope of my invention as defined in the claims appended.

As will be noticed by reference to Fig. 2 the end portions of the elevator apron 59 and the end portions of the roller 7 are broken away, this to indicate that the apron 59 and the roller 7 may be equal in length to the width of the vehicle body or may be of any other length compatible with the purpose of my invention. I would also have it understood that the shoe or scoop 39 and its shield 40 may, if desired, correspond in length with the elevator apron and the roller 7, and that the space between the side plates 41 may also correspond to the length of the apron 59 and the roller 7. It is further to be understood that the extensible shafts for rocking the belts 14 may be of any construction not incompatible with the purpose of my invention.

Having described my invention, what I claim and desire to secure by Letters-Patent, is:

1. In a loading apparatus, the combination of runners, a frame adjustable vertically above the runners, a breaker, a shoe and an elevator carried by said frame, racks carried by and extending upwardly from the runners, boxes arranged on the frame and receiving said racks, shafts journaled in said boxes and having pinions intermeshed with the racks, and means for adjustably fixing said shafts against rotation.

2. In a loading apparatus, the combination of runners, a frame carried thereby, means for taking material from the ground also carried by the runners, curvilinear racks connected to and extending upwardly from the runners, a swinging elevator pivoted to the frame, a shaft journaled in the frame of said elevator and having pinions intermeshed with said racks, means for adjustably fixing the shaft against rotation, and means for actuating the elevator.

3. The combination in a loading apparatus, of runners, curvilinear racks connected to and extending upwardly from the runners, a vertically adjustable frame having boxes receiving said racks, shafts journaled in the boxes and having pinions intermeshed with the racks, means for holding said shafts against rotation, a shoe, a breaker and an elevator carried by the frame, said elevator being pivoted to the frame, curvilinear racks connected to and extending upwardly from the runners, a shaft carried by the elevator and having pinions intermeshed with said racks, and means for adjustably fixing said shaft against rotation.

4. In an apparatus for the purpose described, the combination of a vehicle having ground wheels and a body, means connected with the vehicle for taking material from the ground, an elevator on said means, means intermediate one of the ground wheels and the elevator for actuating the latter by the former, bails mounted above the body and pivotally connected therewith so as to swing transversely of the body, rollers carried by said bails, a roller mounted on the rear portion of the body, belts passed around said roller and also around the rollers in the bails and adapted to receive material from the elevator, and means intermediate one of the ground wheels of the vehicle and the bails for oscillating the bails.

5. In an apparatus for the purpose described, the combination of a vehicle having ground wheels and a body, conveyer belts mounted above the body and having forward portions constructed and arranged to be oscillated transversely of the body, and means intermediate one of the ground wheels of the forward portions of the belts for oscillating the latter, and means intermediate one of the ground wheels and the belts for driving said belts.

6. In an apparatus for the purpose described, the combination of a vehicle having ground wheels and a body, a transverse rock shaft journaled in the rear portion of the body and bearing beveled gears, means intermediate one of the ground wheels and said shaft for rocking the latter about its axis, a roller mounted in the body in rear of said rock shaft, transversely-rocking bails mounted in the forward portion of the body and adjustable lengthwise thereof, rollers mounted in said bails, belts mounted on the rear roller and the rollers in the bails, means connected with one of the ground wheels for rotating the rear roller, extensible shafts connected with the beveled gears and the bail rollers, and belts on the rollers.

In testimony whereof I have hereunto set my hand in presence of two subscribing witnesses.

WILLIAM MURPHY.

Witnesses:
F. KENNEDY,
H. H. HOLIFER.